United States Patent [19]

Sanchez

[11] Patent Number: 5,960,145
[45] Date of Patent: Sep. 28, 1999

[54] OPTICAL FIBER IMAGE CONDUIT AND METHOD USING SAME

[76] Inventor: Jorge O. Sanchez, 29082 Canyon Rim Dr., Trabuco Canyon, Calif. 92679

[21] Appl. No.: 08/785,863

[22] Filed: Jan. 21, 1997

[51] Int. Cl.[6] .................................................. G02B 5/06
[52] U.S. Cl. ....................... 385/116; 385/115; 385/117; 385/118
[58] Field of Search .................................. 385/115, 116, 385/117, 118, 119

[56] References Cited

U.S. PATENT DOCUMENTS

| 3,270,641 | 9/1966 | Gosselin | 385/119 X |
| 3,610,231 | 10/1971 | Takahashi | 385/119 X |
| 4,530,568 | 7/1985 | Haduch et al. | 385/118 X |
| 4,575,185 | 3/1986 | Wentzell et al. | 385/118 X |
| 4,770,443 | 9/1988 | Yamamoto | 385/119 X |
| 4,871,229 | 10/1989 | Tashiro | 385/117 X |

Primary Examiner—Brian Healy
Attorney, Agent, or Firm—Brown, Martin, Haller & McClain

[57] ABSTRACT

The image-receiving end of a flexible image conduit, which includes an optical fiber bundle enclosed in a flexible sheath, is movable throughout a generally dome-shaped area in response to movement of an actuator by a user. Additional fiber bundles illuminate objects at the image-receiving end of the conduit. The motion control system that steers the image-receiving end of the conduit facilitates inspection of objects in spaces that are beyond the user's line of sight. Two pairs of cables are enclosed in the flexible sheath along the length of the conduit. One end of each cable is attached to the image-receiving end of the conduit. The other end of each cable pair is attached to a rotatable actuator at the opposite end of the conduit. The cable pair moves in response to rotation of the actuator; one cable pulls the sheath near the transmitting end of the conduit, and the other cable releases slack. The conduit flexes in an arcuate shape in response to the pulling force. Two actuators are provided to flex the conduit along two perpendicular axes.

15 Claims, 2 Drawing Sheets

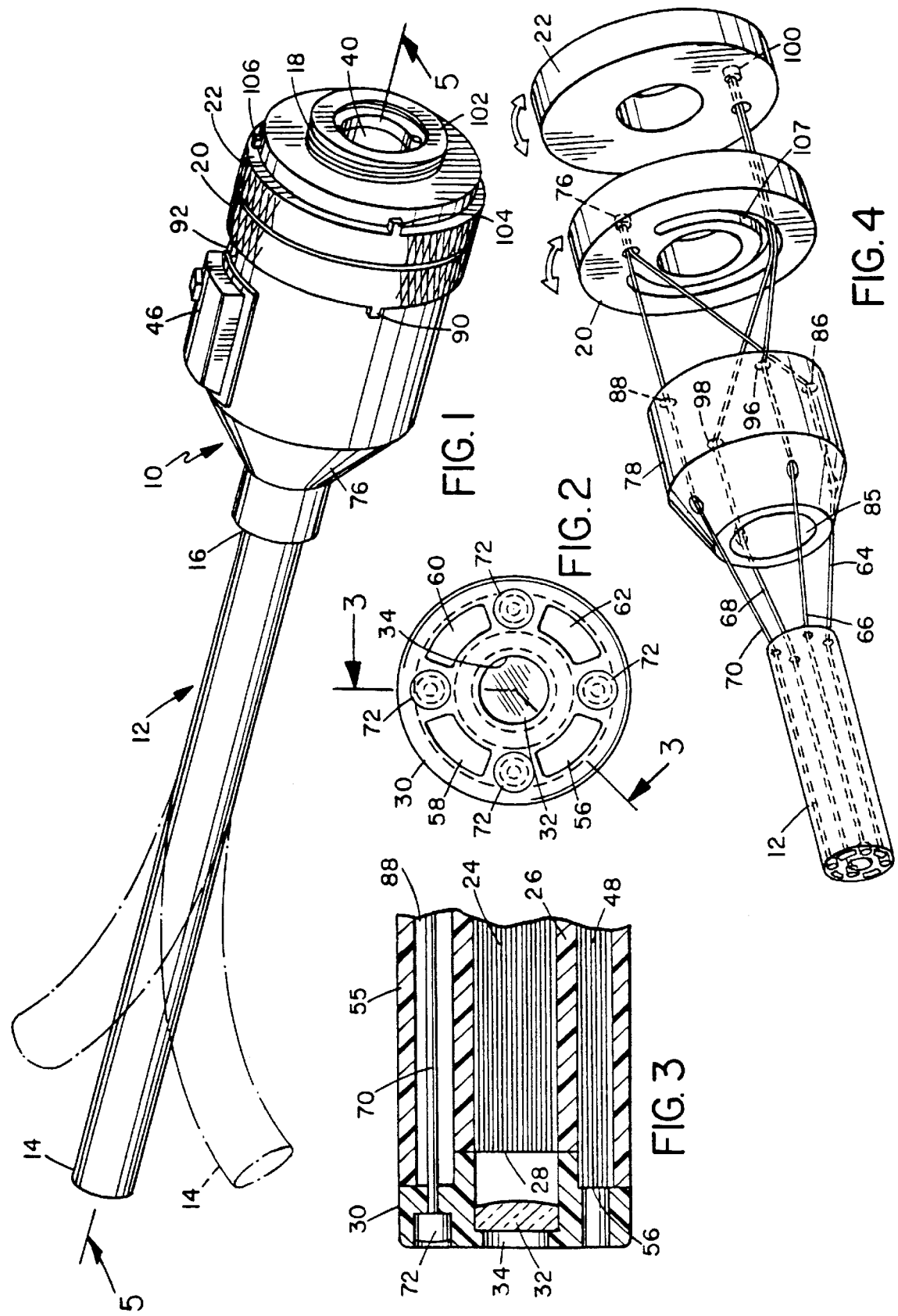

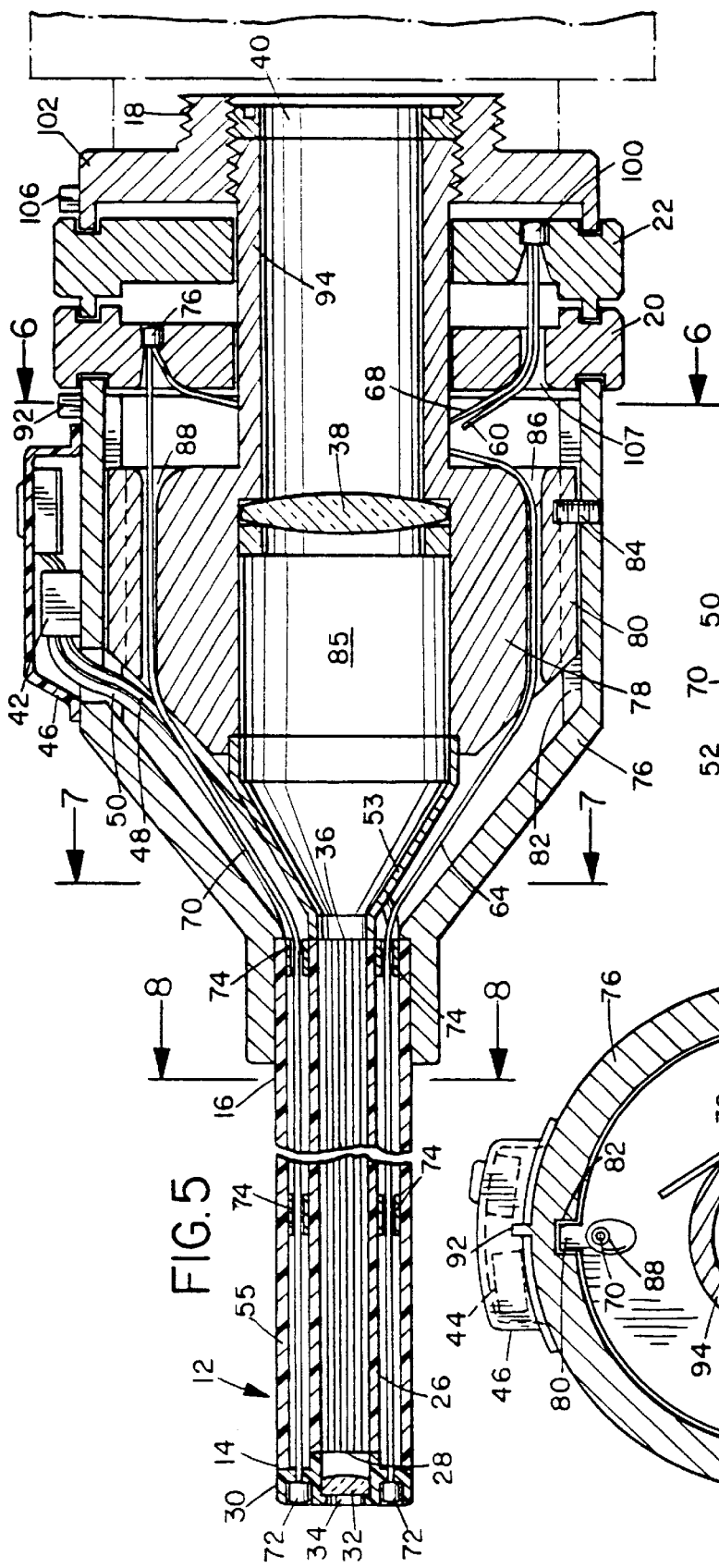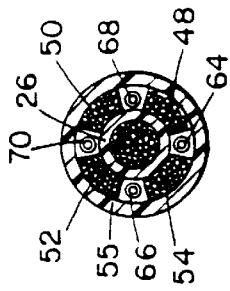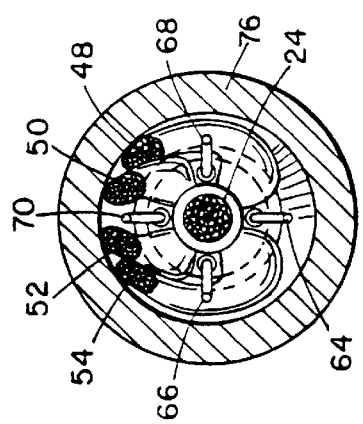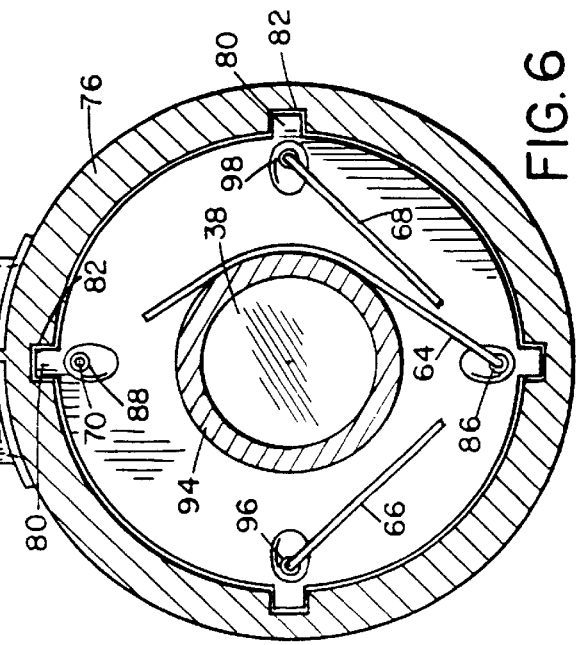

OPTICAL FIBER IMAGE CONDUIT AND METHOD USING SAME

BACKGROUND OF THE INVENTION

Fiber optic technology has provided the means by which medical professionals may examine the internal structure of a patient's body without the highly invasive procedures that were previously required. The fiber-optic image conduits that are used in medical endoscopes are well known. In addition, other types of borescopes are known which employ fiber optic, light illumination, mirrors, lenses and other optics to permit internal inspection of small and relatively inaccessible places. Exemplary systems are disclosed in U.S. Pat. No. 4,281,929, issued to Lord et al., and U.S. Pat. No. 3,610,726, issued to Aijala. An image conduit essentially comprises a bundle of optical fibers. At a first end of the conduit, a lens focuses light, which defines an image, onto the densely packed ends of the fibers. The fiber bundle transmits the light from the first end to the second end. At the second end of the conduit, another lens focuses the light onto an image plane. A receiver, such as a viewing screen, CCD array, photographic film or other light-sensitive device, converts the light at the image plane into an image observable by the user. The user can insert the first end of the conduit into a relatively confined space to observe an otherwise inaccessible area or through a small opening to observe the interior of a body.

Image conduits may also include a flexible sleeve that encases the fiber bundles. The conduit flexes to allow a user to observe spaces not in the user's direct line of sight. If the space is bounded by walls, such as a those of a bore or bodily organ, the user can snake the conduit along the walls and the conduit will flex to conform to the contours of the walls while continuing to transmit the image. Other image conduits have a semi-rigid flexible sleeve that maintains its shape when a user bends the conduit into a desired shape.

Image conduits, such as those disclosed in the above-referenced U.S. patents, may also include a second fiber bundle that transmits light from the second end to the first end for illuminating the area to be inspected.

A major disadvantage of the prior art endoscopes, borescopes and similar devices is the high level of sophistication and the associated high costs, and the special equipment that is often needed to view the target image. Medical imaging systems typically cost into the thousands of dollars. This cost has kept this versatile imaging capability from the average consumer and smaller businesses who would likely have a number of different applications for such a capability. For example, teachers, and their students, could benefit from the ability to study biology, physics or geology in situations that are normally hidden from view. Plumbers, exterminators, and auto mechanics, among others would be able to diagnose problems more rapidly if they could look within confined or hard-to-access areas.

Another disadvantage of many of the prior art designs is that once a user has inserted an image conduit into a confined space beyond the user's reach, the user has little control over its movement. It would be desirable to provide an image conduit with a steering control system that allows a user to direct the movement of the conduit after it has been inserted into a space. The above-described problems and deficiencies are clearly felt in the art and are solved by the present invention in the manner described below.

BRIEF SUMMARY OF THE INVENTION

In an exemplary embodiment, the present invention comprises an image conduit with a steering control system that allows an operator to remotely direct the transmitting end of the conduit. The invention is connectable to a video camera or other device that allows the operator to observe the area in front of the transmitting end of the conduit. The conduit comprises a bundle of optical fibers enclosed in a flexible sheath. The conduit may also comprise one or more lenses at its ends. Light, which defines an image, is transmitted via the bundle from the transmitting end to the receiving end of the conduit. The invention may further comprise one or more fiber bundles for providing light to the transmitting end of the conduit to illuminate objects or areas observed.

The steering control system has a suitable linkage within the sheath that extends along the length of the conduit between the transmitting end of the conduit and an actuator near the receiving end of the conduit. The actuator, which is movable with respect to the sheath, may comprise any suitable mechanism, such as a rotatable ring, a movable lever, a rotatable knob, or a servomotor. The linkage, which may comprise one or more cables, moves in response to movement of the actuator. The linkage pulls the sheath near the transmitting end of the conduit, and the sheath flexes in an arcuate shape in response to this pulling force. The linkage may include a pair of cables to provide differential motion; one cable pulling a portion of the sheath and the other cable providing slack to an opposite portion. Furthermore, the invention may have a plurality of such actuators and corresponding cables or cable pairs to provide motion along a plurality of axes. For example, a first actuator may effect movement of the transmitting end along a first axis, and a second actuator may effect movement of the transmitting end along a second axis perpendicular to the first. A user can thus steer the transmitting end throughout a range of positions.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 1 is a perspective view of the optical conduit;

FIG. 2 is an enlarged end view of the distal end of the optical conduit;

FIG. 3 is a sectional view taken on line 3—3 of FIG. 2;

FIG. 4 is a schematic view of the cable motion control system of the optical conduit;

FIG. 5 is an enlarged sectional view taken on line 5—5 of FIG. 1;

FIG. 6 is an enlarged sectional view taken on line 6—6 of FIG. 5;

FIG. 7 is an enlarged sectional view taken on line 7—7 of FIG. 5, with the light shield omitted for clarity; and FIG. 8 is an enlarged sectional view taken on line 8—8 of FIG. 5.

DETAILED DESCRIPTION OF A PREFERRED EMBODIMENT

As illustrated in FIG. 1, the present invention has a body 10 connected to an image conduit 12. Image conduit 12 has a distal end 14 and a proximal end 16. Body 10 includes a screw-mount 18 for attaching the invention to either a still or video camera (not shown). Body 10 also includes a horizontal motion ring 20 and a vertical motion ring 22 that actuate a steering system. As described below in further detail, rotating horizontal motion ring 20 steers distal end 14 along a first axis, and rotating vertical motion ring 22 steers distal end 14 along a second axis perpendicular to the first axis. Although these axes and their corresponding motion rings are denoted "horizontal" and "vertical," it should be understood that the orientation of the present invention with respect to the earth is immaterial to its operation, and that such references are made merely to assist in illustration of the invention. When motion rings 20 and 22 are in a neutral position, as described below, conduit 12 assumes the linear shape shown in solid line in FIG. 1. When one of motion rings 20 and 22 is rotated in a clockwise or counterclockwise direction from its neutral position, distal end 14 moves in a first direction or a second, opposite direction, respectively, along the corresponding horizontal or vertical axis, as shown in phantom line in FIG. 1. By moving both rings 20 and 22, simultaneously or sequentially, a user can steer distal end 14 to any position in a generally dome-shaped or mushroom-shaped area.

As best illustrated in FIGS. 3, 5 and 8, conduit 12 includes an image fiber bundle 24, which consists of multiple closely-packed optical fibers. Image fiber bundle 24 is encased in an inner sheath 26, which is made of a suitable flexible material. As illustrated in FIG. 3, the ends of the fibers of which image fiber bundle 24 is composed are tightly packed together and polished to form a light-receiving surface 28 at distal end 14 of conduit 12. Distal end 14 includes an annular cap 30 in which a lens 32 is mounted at a predetermined distance from light-receiving surface 28. Light produced by or reflected by objects (not shown) is received through the entrance opening 34 in cap 30 and focused by lens 32 onto light-receiving surface 28, thereby forming an image of the objects on light-receiving surface 28. As illustrated in FIG. 5, light transmitted through image fiber bundle 24 forms a corresponding image on a light-emitting surface 36, which has the same construction as light-receiving surface 28. Each fiber in image fiber bundle 24 is disposed at light-receiving surface 28 in the same relative position in light-emitting surface 36 to accurately reconstruct the image. Light emitted by light-emitting surface 36 is focused by a lens 38 mounted in body 10 through an exit opening 40 onto an image plane (not shown). The image plane may be that of a video or still-photography camera, shown in phantom line in FIG. 5, attached to screw-mount 18. The screw-mount 18 is adapted to conform to standard lens or filter sizes so that the invention can be easily integrated with the camera without requiring special hardware. Accordingly, the screw-mount 18 may be externally or internally threaded as needed to fit mounting means on the camera lens. Using this attachment, one can observe the image of the objects and generate records of the image.

The present invention can illuminate the objects under observation. As illustrated in FIG. 5, body 10 includes a light source 42, such as an incandescent bulb, powered by a battery 44. A removable cover 46 allows access for replacement of battery 44 or light source 42. Light source 42 includes a suitable manifold that optically couples it to four illumination fiber bundles 48, 50, 52 and 54, each consisting of multiple optical fibers, as illustrated in FIGS. 7 and 8. A conical light shield 53 prevents any stray light emanating from illumination fiber bundles 48–54 from interfering with the light emitted by light-emitting surface 36. Illumination fiber bundles 48–54 are distributed evenly around inner sheath 26 and are sandwiched between inner sheath 26 and an outer sheath 55, which is made of a suitable flexible material. As best illustrated in FIG. 2, illumination fiber bundles 48–54 terminate at cap 30 in light-emitting surfaces 56, 58, 60 and 62, respectively, which have structures similar to those of surfaces 28 and 36.

As illustrated in FIGS. 4 and 5, in addition to vertical and horizontal motion rings 20 and 22, the steering control system comprises four control cables 64, 66, 68 and 70. Each of control cables 64–70 has an end secured to cap 30 with an anchor 72, as illustrated in FIGS. 2, 3 and 5. The ends of cables 64 and 70 and the ends of cables 66 and 68 are secured to cap 30 at diametrically opposed points. The ends of cables 64 and 70 are offset by 90 degrees from the ends of cables 66 and 68. Cables 64–70 extend along conduit 12 between inner sheath 26 and outer sheath 55. As shown in FIG. 5, guides 74 retain cables 64–70 in a fixed orientation. Guides 74 are preferably made of a low-friction material to facilitate sliding movement of cables 64–70 in guides 74.

Proximal end 16 of conduit 12 is connected to the housing 76 of body 10. The generally tubular barrel 78, in which lens 38 is mounted, is disposed in housing 76. Barrel 78 has tabs 80 that engage slots 82 to prevent relative rotation between barrel 78 and housing 76. A set screw 84 extends through housing 76 and contacts barrel 78 to retain barrel 78 in housing 76. The walls of the central bore 85 of barrel 78 as well as the inner walls of conical light shield 53 are preferably blackened to minimize internal reflections.

Cables 64 and 70 control vertical motion. Pulling cable 64 and letting out a corresponding amount of slack in cable 70 steers distal end 14 downward. Pulling cable 70 and letting out a corresponding amount of slack in cable 64 steers distal end 14 upward. As stated above, the ends of cables 64 and 70 are connected to diametrically opposed points on cap 30 at distal end 14. Maintaining that same diametrically opposed orientation, cables 64 and 70 extend into housing 76 and further extend through two peripheral bores 86 and 88, respectively, in barrel 78. The opposite ends of cables 64 and 70 are connected to a common anchor 76 on vertical motion ring 20.

Vertical motion ring 20 is rotatably mounted between housing 76 and horizontal motion ring 22. A stop 90 on vertical motion ring 20 contacts a bumper 92 on housing 76 to prevent its over-rotation in the counterclockwise direction (with respect to a view similar to FIG. 6). When vertical motion ring 20 is in the rotational position shown in FIG. 5, cable 70 extends directly from the ends of peripheral bore 70 into anchor 76 while cable 64 is partially wound around the extension 94 of barrel 78. In this position, a maximal length of cable 64 and a minimal length of cable 70 are thus maintained between barrel 78 and vertical motion ring 20. Therefore, distal end 14 would be positioned downwardly, although not shown in FIG. 5 for clarity. Rotating vertical motion ring 20 in a clockwise direction (with respect to a view similar to FIG. 6) feeds additional portions of cable 64 into peripheral bore 86 and retracts a corresponding length of cable 70 from peripheral bore 88. In response to this slackening and pulling of cables 64 and 70, respectively, distal end 14 would move upwardly. Vertical motion ring 20 can be rotated in this manner until a minimal length of cable 64 and a maximal length of cable 70 are maintained between barrel 78 and vertical motion ring 20. Further rotation in this direction is not possible because cables 64 and 70 will interfere with cables 66 and 68.

Cables 66 and 68 control horizontal motion. Pulling cable 66 and letting out a corresponding amount of slack in cable 68 steers distal end 14 leftwardly. Pulling cable 68 and letting out a corresponding amount of slack in cable 66 steers distal end 14 rightwardly. As stated above, the ends of cables 66 and 68 are connected to diametrically opposed points on cap 30 at distal end 14. Maintaining that same diametrically opposed orientation, cables 66 and 68 extend into housing 76 and further extend through two peripheral bores 96 and 98, respectively, in barrel 78. The opposite ends of cables 66 and 68 are connected to a common anchor 100 on vertical motion ring 22.

Horizontal motion ring 22 is rotatably mounted between vertical motion ring 20 and an endcap 102. A stop 104 on horizontal motion ring 22 contacts a bumper 106 on endcap 102 to prevent its over-rotation. Cables 66 and 68 extend through an arcuate slot 107 in vertical motion ring 20. When horizontal motion ring 22 is in the rotational position shown in FIG. 5, cables 66 and 68 are each partially wound around the extension 94 of barrel 78. In this position, equal lengths of cables 64 and 66 are maintained between barrel 78 and vertical motion ring 20. Therefore, distal end 14 would be positioned centrally or neutrally. Rotating horizontal motion ring 22 in a clockwise direction (with respect to a view similar to FIG. 6) feeds additional portions of cable 66 into peripheral bore 96 and retracts a corresponding length of cable 68 from peripheral bore 98. In response to this slackening and pulling of cables 66 and 68, respectively, distal end 14 would move rightwardly. Horizontal motion ring 22 can be rotated in this manner until a minimal length of cable 66 and a maximal length of cable 68 are maintained between barrel 78 and vertical motion ring 20. Further rotation in this direction is not possible because cables 66 and 68 will interfere with cables 64 and 70. Similarly, rotating horizontal motion ring 22 in a counterclockwise direction (with respect to a view similar to FIG. 6) feeds additional portions of cable 68 into peripheral bore 98 and retracts a corresponding length of cable 66 from peripheral bore 96. In response to this slackening and pulling of cables 68 and 66, respectively, distal end 14 would move leftwardly. Horizontal motion ring 22 can be rotated in this manner until a minimal length of cable 68 and a maximal length of cable 66 are maintained between barrel 78 and vertical motion ring 20. Further rotation in this direction is not possible because cables 66 and 68 will interfere with cables 64 and 70.

The flexible material of inner and outer sheaths 26 and 55 may be resilient to return conduit 12 to the straight or neutral orientation shown in solid line in FIG. 1 when the user releases horizontal and vertical motion rings 20 and 22 from his grasp.

Persons of skill in the art will understand that the steering system may be modified to provide either a greater range of motion or a finer control of positioning of distal end 14. For example, the cable could be wound or spooled around extension 94 multiple times if a suitable means for guiding the cables were provided that prevents the horizontal and vertical cable pairs from interfering with one another. Winding the cables around extension 94 multiple times would allow a user to steer distal end 14 over an even greater range, including positions in which conduit 12 is curved back on itself by 180 degrees or more.

The optical conduit of the present invention provides a relatively simple device which allows a user to easily adapt a still or video camera to view and record images within small and/or confined areas. The optical conduit provides a capability to the average consumer which was previously only available to medical facilities and large industrial organizations, for use as teaching tools, special effects photography, maintenance trouble shooting and procedures such as plumbing, extermination, auto repair, etc, and for hobbies.

It will be evident that there are additional embodiments and applications which are not disclosed in the detailed description but which clearly fall within the scope and spirit of the present invention. The specification is, therefore, not intended to be limiting, and the scope of the invention is to be limited only by the following claims.

What is claimed is:

1. An image conduit, comprising:

a body having an axis;

a hollow tubular sheath having a first end and a second end, said second end connected to said body;

an image fiber bundle inside said sheath having a first end at said first end of said sheath and a second end at said second end of said sheath;

an actuator mounted coaxially with respect to said body, said actuator being rotatable on said axis; and at least one linkage inside said sheath, said linkage having a first end connected to said first end of said sheath and a second end connected to said actuator, said first end of said sheath moving in response to rotation of said actuator.

2. The image conduit claimed in claim 1, wherein said linkage comprises first and second cables longitudinally slidable with respect to at least a portion of said sheath, each said cable having a first end and a second end, said second ends of said cables are attached to points at said first end of said sheath spaced 180 degrees apart, said first cable slides in a first direction and said second cable slides in a second direction in response to a first movement of said actuator, and said first cable slides in said second direction and said second cable slides in said first direction in response to a second movement of said actuator.

3. The image conduit claimed in claim 1, wherein:

said linkage comprises first and second cables longitudinally slidable in said sheath and said body, and each said cable has a first end and a second end;

said first ends of said first and second cables are attached to points at said first end of said sheath spaced 180 degrees apart;

said body has first and second bores substantially 180 degrees apart with respect to said axis, said first cable extending through said first bore and said second cable extending through said second bore; and said second ends of said first and second cables are attached to a point on said annular member.

4. The image conduit claimed in claim 1, wherein said actuator comprises first and second annular members, each rotatably mounted on said body in axial alignment with said body, said first end of said sheath moves in a first direction in response to rotation of said first annular member, and said first end of said sheath moves in a second direction in response to rotation of said second annular member.

5. The image conduit claimed in claim 4, wherein said first and second directions are perpendicular.

6. The image conduit claimed in claim 5, wherein:

said linkage comprises first, second, third and fourth cables longitudinally slidable in said sheath and said body, and each said cable has a first end and a second end;

said body has first and second bores substantially 180 degrees apart with respect to said axis, said first cable extending through said first bore and said second cable extending through said second bore;

said body has third and fourth bores substantially 180 degrees apart with respect to said axis, said third cable extending through said third bore and said fourth cable extending through said fourth bore; and said first ends of said first and second cables are attached to a point on said first annular member, and said first ends of said second and third cables are attached to a point on said second annular member.

7. The image conduit claimed in claim 6, wherein said first annular member has a slot through which said second and third cables extend.

8. The image conduit claimed in claim 1, further comprising:

a light source;

at least four illumination fiber bundles in said sheath, each having a first end between said first ends of said cables and a second end at said light source.

9. The image conduit claimed in claim 1, further comprising a first lens at said first end of said image fiber bundle and a second lens at said second end of said image fiber bundle.

10. The image conduit claimed in claim 1, further comprising a mounting means for attaching the image conduit to a camera lens.

11. A method for using a flexible image conduit having a sheath, an image fiber bundle in said sheath for transmitting an image, an actuator mounted coaxially with respect to an axis of said conduit, and a linkage in said sheath, said image fiber bundle having a first end adjacent a first sheath end and a second end adjacent a second sheath end, said linkage connecting said second sheath end of said sheath to said actuator, said first end of said image fiber bundle moving in response to motion of said actuator, said method comprising the steps of:

rotating said actuator on said axis until said first end of said image fiber bundle is pointed in a selected direction; and observing a transmitted image.

12. The method for using an image conduit claimed in claim 11, wherein said step of rotating said actuator comprises the steps of:

rotating a first actuator ring; and rotating a second actuator ring independently of said first actuator ring.

13. The method for using an image conduit claimed in claim 11, further comprising the step of transmitting light toward said first end of said image fiber bundle through an illumination fiber bundle in said sheath.

14. A method for using a flexible image conduit comprising a sheath having a first end and a second end, and an actuator mounted with respect to an axis of said conduit and adjacent said second end of said sheath, said sheath having an image fiber bundle for transmitting an image, an illumination fiber bundle for transmitting light toward said first end, and an integral linkage for connecting said second end of said sheath to said actuator and for moving said first end of said sheath in response to motion of said actuator, said method comprising the steps of:

applying an illumination means to said illumination fiber bundle;

rotating said actuator on said axis until said first end of said sheath is pointed in a selected direction; and observing a transmitted image.

15. The method of use of claim 14, wherein said actuator has a first actuator ring independently moveable from a second actuator ring, the method further comprising the steps of:

rotating said first actuator ring to move said first end in a first plane; and rotating said second actuator ring to move said first end in a second plane.

\* \* \* \* \*